July 29, 1969     E. KNOLL     3,458,614
METHOD FOR THE MANUFACTURE OF MOLDED COMPOSITE RELIEF SHEETS
Filed March 3, 1967
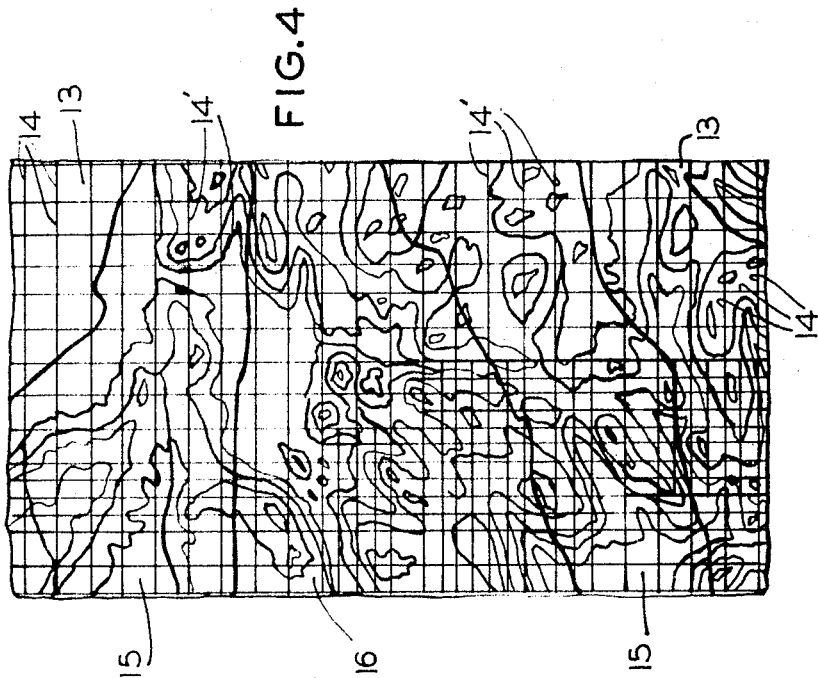
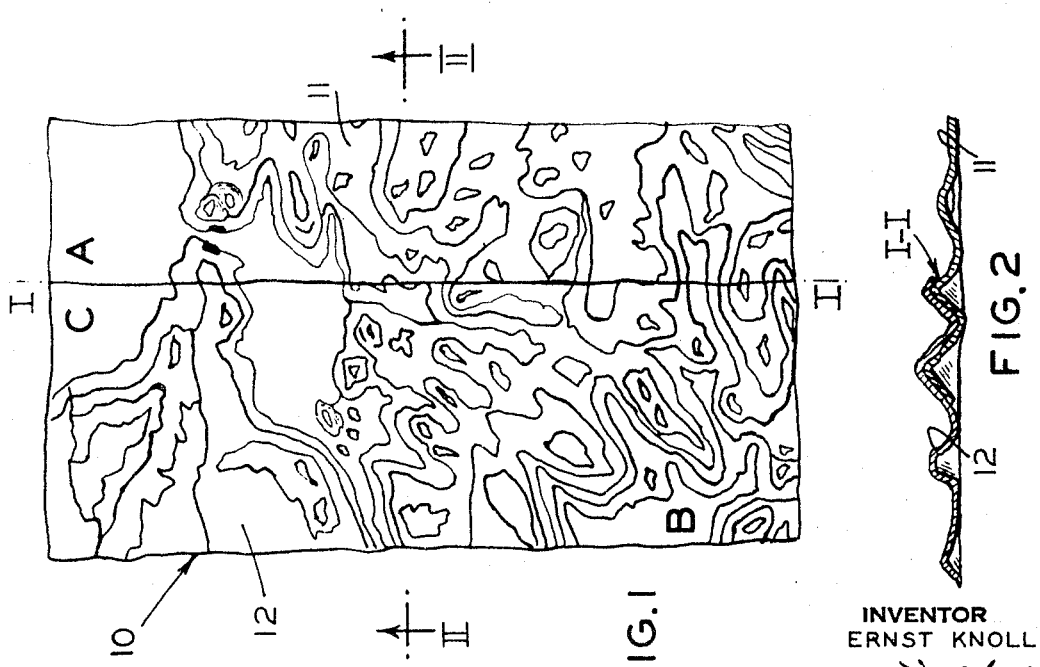
INVENTOR
ERNST KNOLL
BY Richards and Cifelli
ATTORNEY

United States Patent Office 3,458,614
Patented July 29, 1969

---

3,458,614
METHOD FOR THE MANUFACTURE OF MOLDED COMPOSITE RELIEF SHEETS
Ernst Knoll, 7 Winterbergstrasse,
4973 Vlotho (Weser), Germany
Filed Mar. 3, 1967, Ser. No. 620,378
Claims priority, application Germany, Mar. 4, 1966,
K 58,646
Int. Cl. C04b 41/42
U.S. Cl. 264—132         3 Claims

---

ABSTRACT OF THE DISCLOSURE

Method for manufacturing composite relief sheets in accurate registry by correcting and normalizing the distortion of the primary image during molding. A visible grid is provided for a relief sheet segment which on remolding the segment to planar form obtains a primary master having a grid proportionately distorted. An assembly of a transparent sheet and transparent template with an undistorted grid pattern placed over the distorted primary master permits the application of an image to the transparent sheet corrected and normalized for distortion by reference to the grid lines thereby producing a corrected, normalized secondary master. This process is repeated and used to obtain corrected normalized sheet segments which are joined to form a composite.

---

BACKGROUND OF THE INVENTION

Field of the invention

The present invention relates to molded relief structures including, but not limited to, topographical maps and, more particularly, to maps of this type composed of molded plastic sheet material. The invention includes a novel method for manufacturing such maps, providing for the reproduction of topographical images and contours with increased accuracy, and for the accurate assembly of a plurality of map segments to form large maps of improved durability and handling properties.

Description of the prior art

As is well known, molded relief structures, i.e. three-dimensional structures having a surface in relief, are useful in models and displays, as dies in transferring images, as ink carriers in printing processes, and in many other diverse applications. A very important application of such relief structures is in the field of topographical maps in which the physical features of a place or geographical region are delineated in minute detail on maps or charts showing the configuration of the surface depicted, including its relief and the elevations of the land masses, the position and contours of its bodies of water, and the roads, cities and other political subdivisions, as well as other aspects of its geography. Therefore, the present invention and its background will be described with reference to topographical relief maps, although it will be apparent to those skilled in the art that the invention is equally applicable to any other desired relief structure.

Previously, one method of manufacturing relief structures and, in particular, topographical relief maps, has been to prepare a molded plastic master pattern with the desired indicia of topographical differentiations, such as elevations above sea level, bodies of water, roads, cities and the like applied in coded colors. In preparing such a master pattern, the first step has been to make a mold in relief reproducing the topography of the area to be depicted. This mold is then employed in conjunction with available molding apparatus, such as a deep draw device for example, which draws a sheet of a suitable flexible plastic material down over the mold so that the plastic conforms closely to and takes the configuration of the relief structure of the mold. The plastic sheet is conventionally an opaque, thermoplastic material of sufficient thickness for adequate mechanical strength, and of a rubber-like elasticity. Such a sheet takes and retains the desired form when heated and forced into intimate contact with the mold, either by the use of a vacuum beneath the sheet to cause air pressure to force it against the mold, or by the use of physical means such as an upper mold cavity for this purpose. On cooling and/or setting the molded plastic sheet is removed from the mold.

The upper surface of the resulting molded plastic sheet, which is in relief corresponding to the contours of the geographical area to be depicted, now has the indicia of topographical differentiation applied by hand or any other suitable means according to known techniques to produce a topographical image. Such indicia may be of any desired type suitable for the purpose, such as contour lines or areas of different colors or texture and may be in black and white, or color, or fluorescent or other dyes, for example. The molded plastic relief sheet with the applied topographical image is then restored to its original flat planar form by any suitable conventional means such as by the use of a deep drawing device or by pressing between heated plattens. The resulting flat plastic sheet with a topographical image on its upper surface, commonly in the form of contour lines or colored areas, is then employed as a master pattern for making prints, usually, but not necessarily in colors, by any conventional process, including photographic processes, and silk screen and other printing processes. The prints may be made on any suitable moldable material, but are preferably made on sheets of the opaque, rubber-like plastic material used for the master. The resulting flat prints are then molded over the original relief mold by any suitable conventional procedure as above, for example, by the use of a deep draw device, thus producing colored sheet plastic topographical relief maps.

While topographical maps produced in the manner described above have come into general use, it has long been recognized that such maps have certain inherent disadvantages. One of the most serious of these disadvantages, from the point of view of the cartographer, and those users interested in the accuracy of the map, is that the contour lines and the contour of colored areas or other topographical indicia on such maps do not coincide exactly with the corresponding original indicia applied to the master pattern in its relief form. This is due to the fact that distortion of these contour lines and other indicia is necessarily introduced when the master pattern is converted to the flat form required to permit production of prints. Therefore, the prints reproduced from the flat master pattern do not accurately reflect the exact three-dimensional contours, and topographical image of the master pattern, even after the prints are themselves molded to relief form.

The distortions inherently present in the relief maps of the prior art are also disadvantageous in that they have precluded the manufacture of large topographical maps of satisfactory handling propreties and durability. The size of relief map portions which can be produced economically and conveniently from available materials and apparatus according to previously known techniques has been limited. More specifically, the preferred plastic sheet material is available commercially in widths no greater than 5 feet. While it would seem that such materials could be produced in greater widths without difficulty, there has been no reason to do so, since available printing and deep draw molding devices capable of handling greater widths are not presently available, and could only be produced at prohibitive costs. Therefore, as a practical matter, map portions only up to 5 feet in width can be produced by the means of available apparatus. This being the case it is necessary to join a plurality of small sheets or segments up to 5 feet in width in order to produce maps of greater size.

Previously, the assembly of such small sheets or segments of a relief map to form a larger map has presented great difficulty due to the distortions in the contour lines and other topographical image inherently present in such separately produced map segments at the edges. Such distortions are not only introduced by flattening the master relief pattern prior to the production of prints, but also in the printing operation and subsequent relief molding of the printed map segments. It is not surprising, therefore, that neither the physical contours nor the contours of the topographical image at the edges of adjacent relief segments of a large map are seldom in accurate alignment. Any attempt to force the corresponding physical and image contours of adjacent relief segments into proper alignment at the edges of such segments sets up tensions and strains within the plastic sheet material.

Such strains and tensions not only tend to rupture any adhesive or heat sealed bond employed to join adjacent portions of the map, but also adversely affects the pliability of the plastic map and its ability to be rolled up upon itself for carrying or storage. Consequently, such distortions and the resulting tensions adversely affect the handling qualities of a large map and, in time, tend to result in rupture of the bonds between adjacent segments of the map with consequent distintegration of the map. These adverse affects of the inherent distortions in relief maps of the prior art have been experienced regardless of whether adjacent segments of the maps have been joined by means of suitable adhesives or by known heat sealing techniques. It is apparent, therefore, that it has not previously been possible to produce large relief maps conveniently and economically, which could be rolled and unrolled repeatedly in use without distintegration in a relatively short time, and that distortions in the topographical image and the plastic sheet material adversely affecting the durability and cartographic accuracy of the map could not be avoided.

BRIEF SUMMARY OF THE INVENTION

The present invention makes possible the manufacture of large relief sheets or maps made up of a plurality of relief sheet segments joined together with their edges overlapping, the physical contours and any images on the overlapping portions of the segments being substantially identical to permit accurate nesting of the overlapped portions and accurate mating of the edges of any images on the overlapped and adjacent portions, without introducing tension or strain to the sheet material. This is accomplished by compensating for differing distortions of the physical relief structure and image in adjacent segments of the relief sheet which are introduced into the primary master patterns from which the different segments of the relief sheet are formed when such patterns are reduced from relief to planar form as required to make prints. Correction and conformation of such distortions is accomplished by transferring the image from the planar primary master pattern to a transparent secondary pattern, modifying the image as it is transferred by interpolation in accordance with the degree of distortion indicated by the relationship of an undistorted grid structure and an identical grid structure on the primary master pattern, which has been distorted by its reduction from relief to planar or flat form. The secondary master pattern formed in this way, having been thus corrected and normalized for distortion of the primary master pattern, is employed in the making of color stencils for use in the printing of sheets to be relief molded into segments of the large relief sheet.

BRIEF DESCRIPTION OF THE DRAWINGS

The invention will now be described in greater detail in conjunction with the accompanying drawings in which like reference characters refer to like parts, and wherein:

FIG. 1 is a top fragmentary plan view of a topographical relief map of the invention, showing the accurately mated images and relief structures of adjacent segments thereof along the line I—I;

FIG. 2, is a cross sectional view of the topographical relief map taken on the line II—II of FIG. 1 showing the contours of the relief structures;

FIG. 3 is an edge view showing a primary master pattern in planar form, an intermediate transparent template and an upper transparent sheet to which the image (not shown) of the primary master pattern is to be transferred to form a secondary master pattern; and FIG. 4, is a fragmentary top plan view of the structure of FIG. 3 showing a portion of the image on the primary master pattern, including distorted grid lines, the undistorted grid lines of the transparent template, and a portion of a modified image applied to the upper transparent sheet.

DETAILED DESCRIPTION

Referring now to the drawings in greater detail, a large topographical relief map 10 is shown to be composed of a plurality of segments, of which, only two, 11 and 12, are illustrated for simplicity. Segment 11 has a portion A which has a unique relief structure and topographical image corresponding to and depicting a particular geographic area. Similarly, segment 12 also has portion B, which has a different unique relief structure and topographical image, representing a different geographical area spaced from that represented by portion A of segment 11. Each of the segments 11 and 12 also has an identical portion C adjacent one edge thereof, which represents the geographical area separating but contiguous with the area A and B of segments 11 and 12, respectively. The relief structure of the portions C of segments 11 and 12 being identical, the two portions fit together in nesting relationship without tension or strain when the segments 11 and 12 are overlapped as shown and bonded together by any suitable means such as by the use of available adhesives or by conventional heat sealing techniques. It will also be seen that the edge of the topographical image of the portion C of segment 12 overlying the portion C of segment 11 mates substantially exactly with the topographical image at the edge of portion A of segment 11 along the line I—I in FIGURE 1. The exact nesting of the two segments and accurate mating of the adjacent topographical images along the line I—I which coincides with the edge of segment 12, without forceful alignment or distortion of the segments 11 and 12 to achieve this end, is made possible by correction and normalization or conformation of differing distortions in the relief structures and topographical images of the portions C of the segments 11 and 12 during their manufacture according to the invention as will be described below.

Each of the different segments of the relief map 10 is manufactured separately. Sheets about 5 feet square, composed of an opaque thermoplastic material of suitable thickness, mechanical strength, flexibility and elasticity are commercially available and have been used previously in the manufacture of composite relief sheets. Previously such sheets of plastic have been molded over a previously prepared relief mold thus reproducing the physical relief structure of the geographical area to be depicted. This same procedure is followed in the method of the present invention, except that before molding the plastic sheet 13 is provided with a grid 14 which may be printed or stamped on the surface by any suitable means to provide a visible open pattern. The grid is preferably made up of spaced straight lines at right angles forming a plurality of squares, and with heavier lines defining regions containing a number of smaller squares, e.g. 4, 16, etc. The grid may, however, take any other suitable form such as a series of concentric circles divided into segments by radii emanating from the common center point, in order to form a grid for reference purposes. Although the lines of the grid 14 are straight originally, it will be seen in FIG. 4 that these lines are distorted after relief molding of the sheet 13 in accordance with the nature of the relief structure.

The relief molded sheet 13 having the distorted grid 14 on its upper surface is now provided with a topographical image by any suitable method such as by hand painting. The image may be of any suitable type to convey the desired information about the geographical area represented by the molded relief structure. For example, the elevation of various areas on the map may be indicated by the application of contour lines or if desired by coloring the areas defined by the contour lines, with coded colors, such as medium green to indicate an elevation from sea level of up to 300 feet, light green for 300–500 feet, buff for 500–1000 feet, light brown for 1000–2000 feet, and dark brown for 2000–4000 feet etc. Lakes may be shown as areas of dark blue, seas and oceans as areas of light blue, rivers may be shown in dark green and cities in red, etc. In applying such indicia to form the topographical image, however, care is taken to preserve the grid 14 on sheet 13.

After applying the topographical image to the molded relief sheet 13 it is reduced to planar or flat form once again by any suitable means such as by the use of a deep draw device or by compressing it between heated plattens, thus completing the formation of a primary master pattern for one segment of the map. The flattening of the primary master pattern in this way is essential to make it useful in reproducing copies by conventional printing techniques as explained above and also for use in the method of this invention. However, flattening of the relief structure causes distortions of the relief structure and the topographical image. This is the source of the problem solved by the present invention. Inasmuch as the relief structures of the unique areas A and B of adjacent segments 11 and 12 are different, when these differing structures are flattened they affect the distortion of the adjacent portions C differently. For this reason the relief structures of the portions C of adjacent relief segments of the prior art did not mate exactly. These slight inaccuracies in adjacent segments of the prior art have caused much difficulty, since they have made it impossible to join adjacent segments of a map with proper alignment of the relief contours and topographical image without stretching or otherwise deforming the mated edges of adjacent segments, thus setting up tensions and strains which eventually rupture the bond between the overlapped segments.

In the method of the present invention, rather than using the primary master pattern to make copies directly for use in assembling the relief maps, a secondary master pattern is first produced which corrects and normalizes the distortions in each segment. Inasmuch as the common or overlapping areas of adjacent segments which would formerly have been distorted differently are now corrected and normalized, the common areas are conformed and thus are adapted to mate accurately. The secondary master pattern is made by the use of a transparent template 15, which may suitably be of the same size as the sheet 13, and which is provided with a grid 14' identical with the original undistorted grid 14 on sheet 13. A transparent sheet 16 coextensive with the template 15 and sheet 13 of the primary master pattern in flat form, is immovably mounted on the template 15. The template-transparent sheet unit is then placed over the primary master pattern with the template 15 in contact with the sheet 13 and with the transparent sheet 16 uppermost. The primary master pattern and template 15 are provided with at least one marginal reference mark and preferably with a plurality of other corresponding reference points to permit the template to be accurately registered with the primary master pattern so that the grid 14' of the template is in exact registration with any distorted portion of the grid 14 of the primary pattern. Intentionally inappropriate color spots may be added to the master pattern for this purpose. As noted previously, however, the grid 14 of the master pattern has been distorted by flattening of the relief image and, therefore, the grid 14 does not coincide with any portion of the grid 14 which has been distorted. Inasmuch as the distortion of the grid 14 in the flat primary master pattern is proportional to the distortion of the topographical image and relief structure of the sheet 13 at its edges, for example, the area of the spaces between corresponding lines of the distorted grid 14 and undistorted grid 14' are proportional to the degree of distortion of the primary master pattern.

A secondary master pattern is now formed on the transparent sheet 16 by application thereto of a topographical image similar to the image of the primary master pattern as seen through the transparent sheet 16 and template 15, but modified to compensate for the distortion of the primary master pattern. The image on the secondary pattern may also be a colored area image, but it is preferred to use only contour lines to delineate the various areas to be colored differently. The modified image may be applied to sheet 16 by hand or by any other suitable means following closely the image on the primary master pattern, but interpolating between the corresponding distorted lines of grid 14 and undistorted lines of grid 14', modifying the contours of the image to a greater or lesser degree in accordance with the degree of divergence of the corresponding grid lines in the area. Starting at the marginal reference mark the template-transparent sheet unit is moved from place to place over the primary pattern as the image within each square or shall area is completed, reregistering the undistorted grid after each move before again beginning to apply the image to sheet 16. The distortions in each small area may be treated separately without accumulating distortions from one area to the next. In this way a secondary master pattern is produced on the transparent sheet 16 which has an image corrected and normalized for the distortions of the primary master pattern. It should be noted that the smaller the squares of the grid are made the more accurate the correction for distortion may be made.

The secondary master pattern is then employed according to conventional techniques, to produce any desired quantity of flat prints. For example, a set of color stencils may be made from the secondary master pattern by known techniques and used in a conventional printing process. Photographic, silk screen or any other suitable reproduction techniques may also be employed. The flat prints obtained in this way on suitable plastic sheets, for example, are then relief molded, being careful to align the marginal reference marks, on the same mold and apparatus used to make the pattern to produce relief molded map segments. The finished relief segments formed in this way will have the colored contours accurately registered with the relief structure.

The above procedure is repeated to make primary and secondary master patterns and relief molded and printed map segments for each section of the desired map. As is conventional in the art, each segment of the map is provided with an insertion, or edge portion identical with an edge portion of the adjacent segment of the map, thus providing an area of overlap between adjacent sections for purposes of attachment. The edges of the relief segments may be trimmed as necessary to provide a sharp straight line when overlapping the adjacent segment. As noted previously, the segments may be joined by means of a suitable adhesive, by heat sealing techniques or by taping the seams or joints, or by a combination of these methods.

It will be appreciated in view of the above discussion that the relief sheet segments produced according to the present invention by the use of a distortion-compensated secondary master pattern, are substantially free from both distortion of the relief structure and distortion of the topographical image, thus making it possible to accurately mate adjacent segments without forcibly aligning them and thus setting up tensions and strains in the sheet material. This being the case large relief sheets or topographical maps assembled from such segments are free from internal tension at the juncture of the individual segments. For this reason, such large sheets are easy and convenient to handle and are capable of being rolled and unrolled repeatedly without rupturing the bonds between adjacent segments. As will be readily appreciated such a map or relief sheet will have a much longer useful life than the tension loaded sheets of the prior art.

In order to hang large relief sheets or maps, the back of the sheet is provided with a series of loops spaced parallel to a horizontal edge of the sheet and attached to the sheet by heat sealing or other suitable means. A thin lath or rod may be inserted through the loop as a suspension bar, if desired, and may also serve as a core on which to roll the sheet for storage or shipping.

The foregoing illustrates the practice of this invention, which, however, is not to be limited thereby.

I claim:

1. In the method of making composite relief sheets composed of a plurality of relief sheet segments joined together at their overlapping edges, wherein each of said segments is obtained by relief molding a first sheet of plastic, applying a visible image to the relief structure of said molded sheet and remolding said first sheet to planar form to produce a primary master pattern, making a print from said primary master pattern on a second plastic sheet, and relief molding said sheet to provide one of said relief sheet segments, the improvement which comprises: providing for each different relief sheet segment, a visible grid structure on the plastic first sheet from which said primary master pattern is formed before molding said sheet and maintaining said grid in visible form after applying the image to said sheet, whereby on remolding said sheet to planar form a primary master pattern is obtained having a visible grid distorted in proportion to the distortion of the image and relief structure thereof, placing over the primary master pattern in registration therewith a unit consisting of a transparent sheet over a transparent template, the latter having a visible grid structure identical with the grid of said primary master pattern before distortion thereof, applying a visible image to said transparent sheet in accordance with the image on said primary master pattern visible therethrough, but modified to correct and normalize the distortion of the said primary image in accordance with and to the extent indicated by the divergence of corresponding undistorted lines of the grid of said template and the distoraed lines of the grid of said primary master pattern, thereby producing a corrected and normalized secondary master pattern, printing on a sheet of third plastic with an image derived from said secondary pattern, and relief molding said printed sheet to obtain a corrected, normalized relief sheet segment, and forming a large relief sheet by joining a plurality of different relief sheet segments obtained from different secondary patterns, edges of adjacent segments having common areas of identical, corrected and normalized relief structure and image, in accurate registration without setting up tensions in said segments.

2. A method according to claim 1, wherein each relief sheet segment obtained from said secondary master pattern has at one edge thereof a portion having the same relief structure and image as a similar portion of an adjacent segment in said large relief sheet, said similar portions of the adjacent segments having been corrected and normalized for distortion in said primary master pattern, whereby when said common portion of the adjacent segments are overlapped the relief structures and images thereof mate accurately without forcible alignment.

3. In the method of making relief sheet segments with edge portions having a relief structure and image substantially the same as those of the edge portion of another relief sheet segment having a different relief structure adjacent said edge portion, which different relief sheet segments are intended to be joined with substantially identical edge portions overlapping, the improvement which comprises: for each of said different relief sheet segments, providing a secondary master pattern sheet having an image thereon derived from the distorted image of a primary master pattern sheet by modifying said image in registration with the corresponding relief structure and normalize said distortions in accordance with and to the extent indicated by comparison of a distorted grid pattern in the primary pattern and a normal corresponding grid pattern in registration therewith, printing plastic sheets with the normalized image from said secondary pattern and relief molding said printed sheets with the image in registration with the corresponding relief structure of the mold.

References Cited

UNITED STATES PATENTS

| | | | |
|---|---|---|---|
| 2,309,752 | 2/1943 | Cooke | 35—41 XR |
| 2,468,731 | 5/1949 | Borkland | 264—1 XR |
| 3,241,429 | 3/1966 | Rice | 264—1 XR |
| 3,378,421 | 4/1968 | Hamilton | 264—1 XR |

ROBERT F. WHITE, Primary Examiner

RICHARD R. KUCIA, Assistant Examiner

U.S. Cl. X.R.

156—59; 264—219